April 23, 1963 H. E. SLOAN ET AL 3,086,784
CHUCK WITH FIXED REST FOR JAW-GRIPPED WORK
Filed March 24, 1961 2 Sheets-Sheet 1
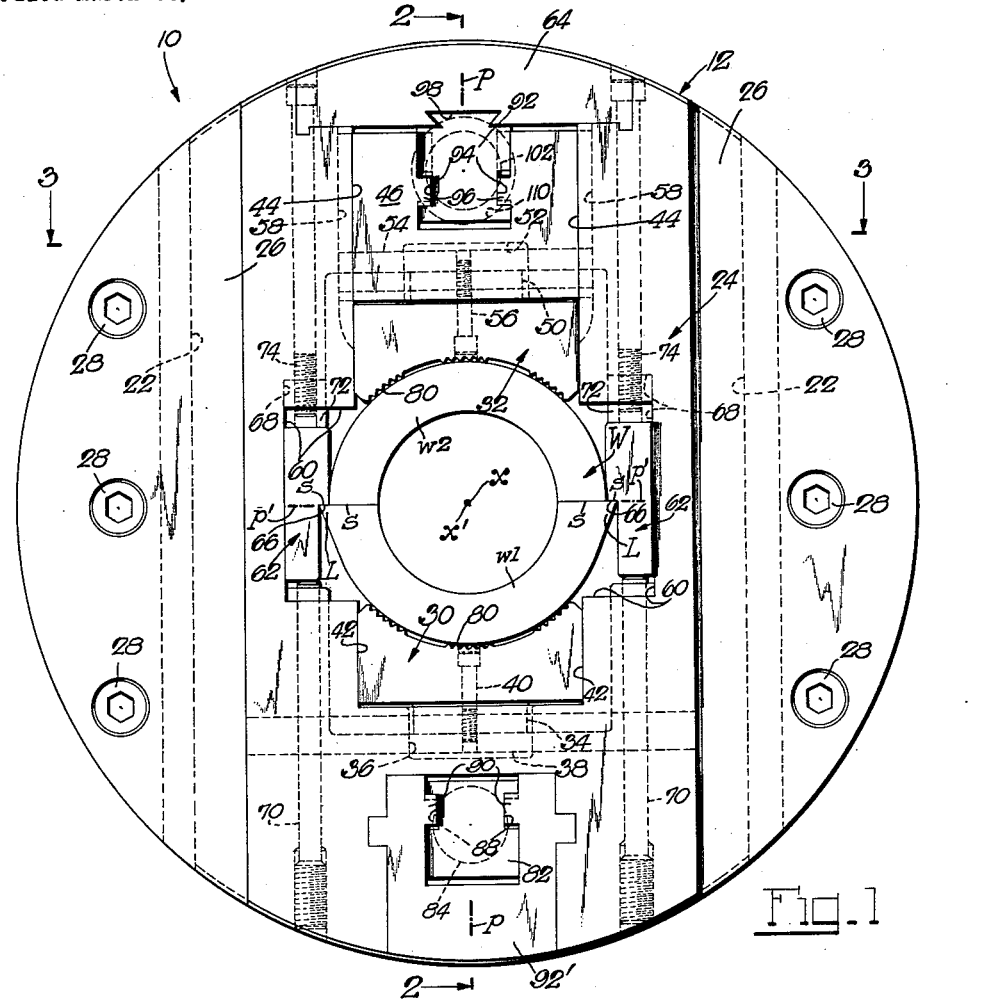
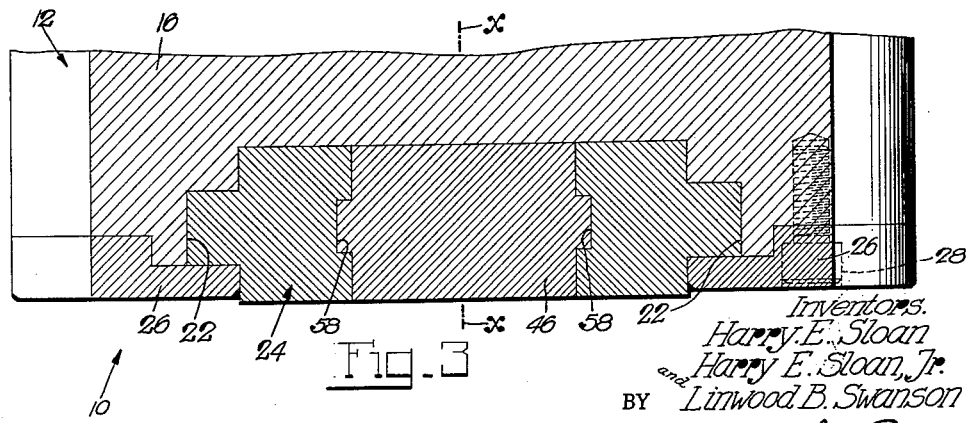
Inventors.
Harry E. Sloan
and Harry E. Sloan, Jr.
BY Linwood B. Swanson
Attorney.

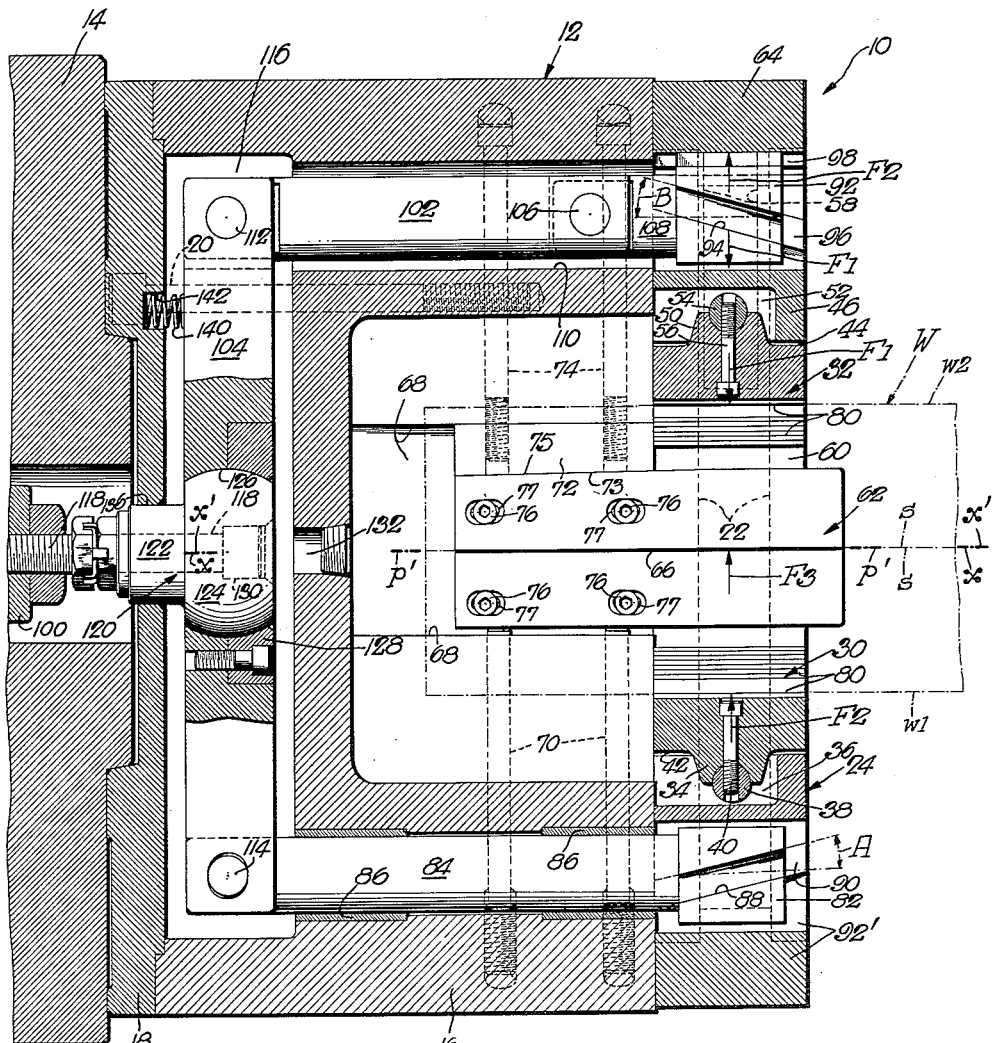
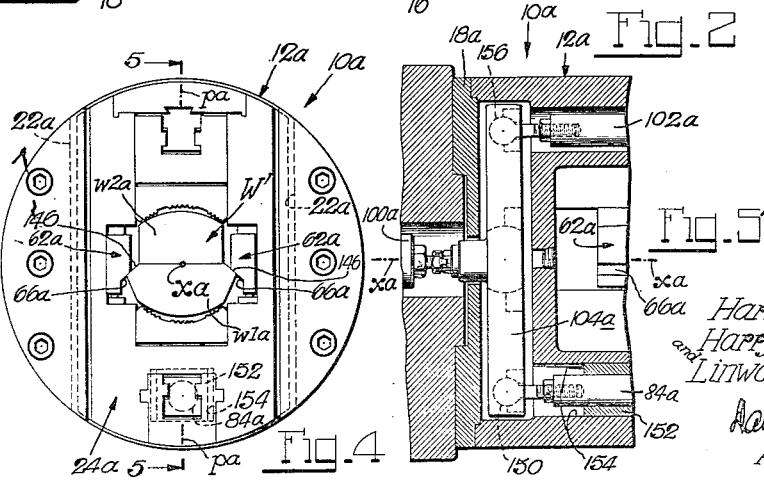

United States Patent Office 3,086,784
Patented Apr. 23, 1963

3,086,784
CHUCK WITH FIXED REST FOR
JAW-GRIPPED WORK
Harry E. Sloan, Hartford, Harry E. Sloan, Jr., West Hartford, and Linwood B. Swanson, Newington, Conn., assignors to The Cushman Chuck Co., Hartford, Conn., a corporation of Connecticut
Filed Mar. 24, 1961, Ser. No. 98,208
15 Claims. (Cl. 279—121)

This invention relates to chucks in general, and to chucks with fixed work rests in particular.

Chucks of the type with which the present invention is concerned have a fixed rest on which to locate work with a reference surface or surfaces thereof, and jaws which are operable to grip and securely hold the work in the chuck independently of the work rest and also seat and retain the work on the latter. While prior chucks of this type are satisfactory in some respects, they are sadly deficient in other respects. Thus, the task of gripping the work in these prior chucks is not only cumbersome and time-consuming but requires considerable skill as well, owing to the fact that the jaws will have to be manipulated individually and most carefully into gripping engagement with the work in order to avoid separation, and particularly hardly noticeable or unnoticeable barest separation, of the work with its reference surface or surfaces from the work rest on the chuck on even careful tightening of the jaws on the work. The task of gripping the work so that it remains firmly located on the chuck rest is further complicated by lack of any percentible indication of the clamping pressures of the individual jaws against the work and of the reference surface or surfaces of the latter against the chuck rest. Therefore, most careful tightening of the individual jaws on the work, and especially final tightening of part of the jaws more firmly than the remainder thereof on the work, is about the only procedure that promises to achieve at least some seating pressure of the reference surface or surfaces of the work on the chuck rest which alone will assure its accurate location on the latter. It is for this reason that these prior chucks are used only where it is imperative that a machining operation on work is accurate to the highest degree with respect to a reference surface or surfaces thereof and, hence, warrants the exceedingly high cost of the operation entailed by these chucks. Furthermore, and outside of cost considerations of operations performed on work in these chucks, the latter simply do not lend themselves to efficient mass production of work where an operation or operations thereon of high accuracy with respect to a reference surface or surfaces thereof would be highly desirable.

Chucks of this type are used for performing especially, though not exclusively, on the closed companion members of partible work, such as molds or parts thereof, for example, of which the reference surface is the parting surface of one of the closed members, making it imperative to apply on the other member jaw pressure in closing direction which in no event is greater, and is preferably less, than the jaw pressure on the one member in its closing direction, as the other member would otherwise tend to and might actually separate the reference parting surface from the rest surface on the chuck.

It is the primary aim and object of the present invention to provide a chuck of this type which has none of the aforementioned deficiencies of the prior chucks, and which will quickly grip work and unfailingly apply seating pressure of the reference surface or surfaces thereof against the chuck rest, thereby permitting highly accurately referenced operations on the work at incomparably lower cost than heretofore, as well as adapting the chuck for the first time to the same highly accurately referenced operations on work in efficient mass production.

It is another object of the present invention to provide a chuck of this type the jaws of which require for their operation neither manipulation by nor the attention of an operator and, instead, operate automatically for their secure grip on work and for unfailing retention of the work reference surfaces on the chuck rest with a uniform force of desired magnitude.

Another object of the present invention is to provide a chuck of this type the jaws of which will respond to an operator's touch of a control by instantaneously closing on and gripping work under power, thereby greatly expediting loading of the chuck with work.

It is a further object of the present invention to provide a chuck of this type in which the jaws will on their aforementioned instantaneous power closure also move the work with its reference surface into seating engagement with the chuck rest as long as the work is initially placed between the open jaws with its reference surface in confronting relation with the chuck rest, thereby requiring no manual holding of the work against the chuck rest on closure of the jaws and, hence, obviating all danger of possible injury to an operator from the closing jaws.

It is another object of the present invention to provide a chuck of this type the jaws of which will on their aforementioned instantaneous power closure move individually to whatever extent is necessary securely to grip work of any shape and force its reference surface into and hold it in secured seating engagement with the chuck rest.

Another object of the present invention is to provide a chuck of this type which is of simple and rugged construction and reasonable cost, yet is highly accurate and reliable in its performance for the longest time.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a front view of a chuck embodying the present invention;

FIG. 2 is a longitudinal section through the chuck taken substantially on the line 2—2 of FIG. 1;

FIG. 3 is a fragmentary section through the same chuck taken substantially on the line 3—3 of FIG. 1;

FIG. 4 is a front view of a chuck at reduced scale embodying the present invention in a modified manner; and FIG. 5 is a fragmentary section through the modified chuck taken substantially on the line 5—5 of FIG. 4.

Referring to the drawings, and more particularly to FIGS. 1 to 3 thereof, the reference numeral 10 designates a chuck having a body 12 which may releasably be mounted on the power spindle 14 of a lathe or other machine tool by suitable bolts (not shown). The chuck body 12 presently consists of front and rear sections 16 and 18 which are bolted together as at 20 (FIG. 2). The chuck body 12 is at its front provided with a guideway 22 in which is received a slide 24 for movement in a plane transverse, and presently normal, to the chuck axis x in two opposite directions, presently diametrically of the chuck body 12. The slide 24 is held in its guideway 22 by suitable gibs 26 which are bolted to the chuck body as at 28 (FIGS. 1 and 3).

The slide 24 is provided at or near one end thereof with jaw means 30 to grip work W on one side thereof, and also carries a movable jaw 32 to grip the work on the opposite side thereof. The jaw means 30 is presently a single jaw which is movable with the slide 24. In the present instance, the jaw 30 is a part separate from the slide 24 to permit preferred slight tilting of the former on the latter. To this end, the jaw 30 has a depending lug 34 which projects into a recess 36 in the slide 24 and is therein seated on a rock shaft 38 in the slide, the jaw 30 being by a screw 40 secured to the shaft 38 for rocking motion therewith (FIGS. 1 and 2). The jaw 30 is also received with a sliding fit in a machined recess 42 in the slide 24 and guided therein for limited rocking motion with the shaft 38 in a plane p which is coincident with the chuck axis x and extends longitudinally of the guideway 22 (FIG. 1).

The slide 24 is at its other end provided with another machined recess 44 for sliding reception of the other jaw 32 and a carrier 46 therefor, with the former being preferably slightly tiltable on the latter in the plane p, the same as the jaw 30. To this end, the jaw 32 has a lug 50 which projects into a recess 52 in its carrier 46 and is therein seated on a rock shaft 54 in the latter and secured thereto by a screw 56 for rocking motion therewith (FIGS. 1 and 2). The jaw carrier 46 is guided in ways 58 in the slide 24 for movement in the same opposite directions in which the latter is guided in the ways 22 in the chuck body (FIGS. 1 and 3), and the jaw 32 is received with a sliding fit in the recess 44 in the slide and guided therein for its limited rocking motion with the shaft 54 in the plane p.

The slide 24 is intermediate its recesses 42 and 44 provided with another and wider recess 60 in which to receive the work W and also the ends of work rests 62 to-be-described. The slide 24 is presently in the general form of a rectangular frame carrying its jaw 30 at one end and being closed at its opposite end by an end part 64 thereof which in the present instance is a part separate from the slide 24 and firmly bolted thereto in any suitable manner (not shown).

The chuck 10 is presently shown with its jaws 30 and 32 closed on and gripping work W and holding the same also on the work rests 62, and more particularly on the machined work locating or rest surfaces 66 thereof. The exemplary work W shown are partible companion pieces, such as those of a partible mold or part thereof, which require accurate machining about their common axis $x'$ in the plane of their parting surfaces s (FIGS. 1 and 2). The work rests 62 are presently mounted in side recesses 68 in the chuck body 12 and extend forwardly through the recess 60 in the slide 24 without interfering with the operational movements of the latter (FIGS. 1 and 2). More particularly, the work rests 62 are in the side recesses 68 forced by bolts 70 against rest rails 72 therein which are held in place by bolts 74 (FIGS. 1 and 2). The rest rails 72 have rest surfaces 73 which are slightly inclined to the chuck axis x and match and engage like tapered surfaces 75 of the work rests 62, with the latter being adjustable on the surfaces 73 for accurately positioning the work rest surfaces 66 in a plane in which the chuck axis x lies. The work rests 62 are further retained in their adjusted positions on the rest rails 72 by clamping screws 76 which extend through elongated slots 77 in the work rests and are threadedly received in the chuck body 12 (FIG. 2). The surfaces 66 of the work rests 62 presently face the jaw 30 on the slide 24 and are adapted to be engaged by the parting surfaces s of the confronting work part on the jaw 30 for location of the work in the chuck, the exemplary confronting work part being to this end provided with permanent or temporary opposite lug formations L to extend its parting surfaces s beyond the companion work part and within reach of the rest surfaces 66. For accurate work location in the chuck, the rest surfaces 66 extend in the plane $p'$ which coincides with the chuck axis x and extends normal to the plane p (FIG. 1). The axis $x'$ of the exemplary work W thus located on the surfaces 66 of the work rests 62, as well as the chuck axis x, lie accurately in the parting plane of the closed work parts as a pre-requisite to the desired accurate work location in the chuck. To complete the desired accurate work location in the chuck, the exemplary work-gripping surfaces 80 of the jaws 30 and 32 are of work-centering type which by virtue of the accurate guidance of the latter in the chuck body in the plane p guide and compel the work to seat on the rest surfaces 66 with its axis $x'$ coincident with the chuck axis x (FIG. 1). The work rests 62 themselves are presently shown to duplicate this latter function of the jaws on the work parts, and would perform this function alone if either or both of the jaws 30 and 32 were of non-centering type, as will be readily understood.

While it will become obvious from the continued description of the present chuck that work W may be placed therein between the open jaws 30, 32 in any angular position of the chuck and the work will be gripped and also located on the rest surfaces 66 by the jaws on closing movement of the latter, let it be assumed, for the sake of simplicity of description and also better understanding of the chuck performance, that the chuck is presently in a rest position like or similar to that shown in FIGS. 1 and 2 in which its jaws 30 and 32 are temporarily bottom and top jaws on the chuck and are also open. In that case, the work W is with its part $w1$ placed on the open jaw 30 on which it will rest by gravity, care being taken to align the parting surfaces s at the lug formations L on the lower work part $w1$ sufficiently with the rest surfaces 66 to seat them on the latter on closure of the jaw 30. In this connection, the work-gripping surface 80 of the jaw 30, being of work-centering type as described, will hold the work W in stable equilibrium during closure of the jaw 30 so that the work need no longer be held between the jaws by an operator after it has been placed on the open jaw 30. To open and close the jaw 30, the slide 24 is moved in opposite directions in its guideway 22, as will be readily understood. On closure of the jaw 30 on the work and ensuing seating of the parting surfaces s of the work part $w1$ on the rest surfaces 66, the other jaw 32 is closed on the other work part $w2$ to hold it closed against and located on the work part $w1$. To open and close the jaw 32, the same is moved in opposite directions in its guideway 58 in the slide 24, as will be readily understood. Optimum gripping engagement of the jaws 30 and 32 with the work periphery even when the same is non-finished and uneven in places, and more importantly, uniform seating engagement of the parting surfaces s of the work part $w1$ with the rest surfaces 66, are assured by virtue of the described permissible limited tilt of the jaws 30 and 32.

To operate the slide 24 for opening and closing movement of its jaws 30, there is provided a wedge member or block 82 which is in follower relation with the slide 24 and has a shank 84 which is guided in bushings 86 in the chuck body 12 for movement parallel to the chuck axis x. The wedge block 82 presently has opposite grooves 88 which are inclined to the chuck axis x at identical wedge angles A (FIG. 2) and receive similarly inclined opposite rib formations 90 in the slide 24, and presently in a steel insert 92' therein, in which the wedge block 82 has adequate top and bottom clearance not to interfere with the operational movement of the slide 24 in its guideway 22 (FIG. 1). It thus follows from FIG. 2 that the slide 24 is with its jaw 30 closed on and opened from the work W on moving the wedge block 82 with its shank 84 to the left and right, respectively, in FIG. 2.

To operate the other jaw 32 for its opening and closing movement, there is provided another wedge member or block 92 which is interposed between and in follower relation with the jaw carrier 46 and the end part 64 of the slide 24, and which is presently also movable with the slide 24 in its operational movements. To this end, the wedge block 92 presently has opposite grooves 94 which are inclined to the chuck axis x at identical wedge angles B (FIG. 2) and receive similarly inclined opposite rib formations 96 in the jaw carrier 46 in which the wedge block 92 has adequate bottom clearance not to interfere with the operational movements of the jaw carrier 46 and its jaw 32 (FIG. 1). The wedge block 92 is also received in a dovetail guide 98 in the end part 64 of the slide 24 for movement parallel to the chuck axis x. It thus follows from FIG. 2 that the jaw 32 is closed on and opened from the work W on moving the wedge block 92 to the left and right, respectively, in FIG. 2.

There is also provided an exemplary releasable operating connection between the wedge blocks 82 and 92 and a draw bar 100 in the power spindle 14 which presently carries the chuck. This connection includes the shank 84 of the wedge block 82, a link bar 102 and a crossbar 104 (FIG. 2). The link bar 102 is at its forward end bifurcated and therein pivotally connected at 106 with the flattened end of a short rearward shank 108 of the wedge block 92. The link bar 102 extends rearwardly in the chuck body 12 through an aperture 110 therein with adequate clearance therefrom for operational freedom, and is at its rear end pivotally connected at 112 with one end of the crossbar 104 (FIG. 2). The other end of the crossbar 104 is pivotally connected at 114 with the rear end of the shank 84 of the wedge block 82. The crossbar 104, which is located in a rear recess 116 in the chuck body 12 with adequate clearance therefrom for its operational freedom, has intermediate its length a universal connection with a screw 118 for its releasable connection with the draw bar 100. This universal connection is presently formed by a part 120 having a shank 122 and a part-spherical head 124 which is fittedly received in a socket formation 126 in the crossbar 104 and securely held therein by a retainer ring 128 (FIG. 2). The screw 118 is received in the part 120 and its head 130 is accessible with a tool through a normally plugged hole 132 in the chuck body. The axes of the pivot connections 106, 112 and 114 are parallel to each other and extend at right angles to the chuck axis x and to the direction of movement of the slide 24 in its guideway 22, so that the link bar 102 and crossbar 104 will have no interference in their operational movements to-be-described.

Assuming now that the work W has just been properly placed on the lower one (30) of the open jaws in the exemplary rest position of the chuck as shown in FIGS. 1 and 2, the operator will actuate a suitable control (not shown) to cause power retraction of the draw bar 100 to the left as viewed in FIG. 2, taking with it the part 120 with its universal connection with the crossbar 104. The crossbar 104 will respond by tilting about the universal connection and first take with it either the wedge and link unit 92, 102 or the wedge and shank unit 82, 84, whichever offers the least resistance. With the chuck in the exemplary rest position in FIGS. 1 and 2, and with the wedge angles A and B being presently identical and the universal connection between the part 120 and the crossbar 104 being presently midway between the pivot connections 112 and 114 of the latter with the link bar 102 and the wedge shank 84, it stands to reason that the wedge and link unit 92, 102 will offer the least resistance to movement with the crossbar 104, since it is aided by the gravity of the jaw 32 and its carrier 46 while the gravity of the slide 24 resists such movement of the wedge and shank unit 82, 84. Accordingly, the crossbar 104 will under the circumstances be tilted counterclockwise about its universal connection and, through intermediation of the link bar 102, move the wedge block 92 to the left (FIG. 2) until the jaw 32 closes on the work W while it still rests on the open lower jaw 30 or until the upper end of the crossbar 104 comes to bear against the rear section 18 of the chuck body 12, whichever occurs first. The crossbar 104 will thereupon continue to tilt about its universal connection, in clockwise direction, however, taking with it the shank 84 with the wedge member 82 to the left (FIG. 2) until the slide 24 with its jaw 30 brings the work W with the parting surfaces s of the work part w1 thereof into seating engagement with the rest surfaces 66 and also clamps the work to the upper jaw 32 if the same has not previously clamped the work to the lower jaw 30. The work is now properly gripped by the jaws and located in the chuck, and the contemplated operation or operations on the work may be undertaken. After the operation or operations have been concluded on the work, the latter will be released from the chuck on power projection of the drawbar 100 to the right (FIG. 2) under the operator's control, as will be readily understood.

The magnitudes of the forces with which the work W is gripped by the jaws 30, 32 and with which it is clamped to the rest surfaces 66 depend, of course, on the wedge angles A and B, the lever arms of the wedge shank 84 and link bar 102 about the universal connection of the crossbar 104, and the magnitude of the rearward pull on the drawbar 100, as will be further explained hereinafter.

The shank 122 of the connector part 120 is presently guided at 136 in the rear section 18 of the chuck body 12, and it is for this reason and for the further reason that the connector screw 118 is threadedly received by the drawbar 100, that the universal connection of the crossbar 104 can move only axially of the connector screw 118, and presently axially of the chuck. Therefore, to permit the aforementioned operational tilting of the crossbar 104 about its universal connection without interference from its pivot connection 114 with the guided wedge shank 84 in the chuck body, the pivot connection 114 is of floating type as shown in FIG. 2.

While in the above-described exemplary closure of the jaws 30 and 32 on the work in the exemplary rest position of the chuck in FIGS. 1 and 2 the upper jaw 32 will first close, whereupon the lower jaw 30 will close, this same sequence of first closure of the upper jaw and subsequent closure of the lower jaw may well be repeated if the chuck is in its rest position inverted 180° from the position in FIGS. 1 and 2 and the jaws 30 and 32 are then the respective upper and lower jaws. In that case, the gravity of the slide 24 aids in the retraction of the wedge block 82 and its shank 84, while the gravity of the jaw 32 and its carrier 46 resists retraction of the link bar 102. In any event, and as already mentioned, the crossbar 104 will, on power retraction of the drawbar 100, tilt and take first along whichever wedge and link unit 92, 102 or wedge and shank unit 82, 84 offers the least initial resistance in any rest position of the chuck, and will thereupon take along the other unit to complete the location and gripping of the work in the chuck.

It is preferred that on power retraction of the drawbar 100 the jaw 30 first locates the work on the rest surfaces 66, whereupon the other jaw 32 closes on the work, regardless of the angular rest position of the chuck. To this end, there is interposed between the rear section 18 of the chuck body 12 and the crossbar 104 a compression spring 140 (FIG. 2) which is presently seated in a recess 142 in the body section 18 for its securement in place thereat. More particularly, the spring 140 bears against the crossbar 104 at a place thereof between its universal connection and its pivot connection 112 with the link bar 102, and the force of this spring is such that on retraction of the drawbar 100 it will resist compression from the crossbar 104 thereat and, hence, act as a fulcrum for the latter until the shank 84 and its wedge block 82 have been sufficiently retracted to seat the work on the rest surfaces 66 regardless of the angular rest position of the chuck. It is only thereafter that on continued retraction of the drawbar 100 the crossbar 104 will compress the spring 140 and retract the wedge block 92 through the connecting link bar 102 to close the other jaw 32 on the work and complete the gripping of the latter by the jaws.

The instant chuck is highly unique and advantageous, in that the jaws will, on the pull of the drawbar 100 of a given magnitude, clamp the work parts w1 and w2 to each other with a predetermined and invariable force and will also seat the work on the rest surfaces 66 with a predetermined and invariable force which will not counteract or in any way reduce the force with which the work parts are clamped to each other by the jaws. In this connection, the arrangement of the wedge element 92 in interposition and follower relation with the jaw carrier 46 and the adjacent end part 64 of the slide 24, as well as its movability with the slide in the operational movements of the latter, is highly significant and imperative to create and sustain the force with which the jaws 30 and 32 clamp the work parts to each other and which in any event must be adequate to withstand all tendencies of even heavy machining or other operations on these work parts to gap them in the slightest and possibly spoil the operation. Thus, assuming that the work W is placed in the open jaws 30 and 32 and that on power retraction of the drawbar 100 the wedge block 82 and its shank 84 are initially locked against retraction with the crossbar 104, the latter will respond by retracting the wedge block 92 until the same has moved the jaw 32 into gripping engagement with the work and the latter into gripping engagement with the jaw 30 on the slide, and the work parts will remain clamped to each other by the jaws 30, 32 with a force determined solely by the action of the wedge block 92 between the jaw 32 and slide 24 and entirely unaffected by the force with which the work is seated on the rest surfaces 66 on subsequent retraction of the wedge block 82 and its shank 84. Thus, on the assumed initial retraction of the wedge block 92 to clamp the work parts to each other by the jaws 30 and 32, the same exerts on the jaw carrier 46 and its jaw 32 a given work-clamping force F1 (FIG. 2), but it also exerts on the end part 64 of the slide 24 a counter force F2 of the same magnitude which through the slide 24 is transmitted to the jaw 30 for clamping the work parts together from the opposite side.

Assuming now that the work parts w1 and w2 are initially clamped and held clamped to each other by the above described action of the wedge block 92, subsequent retraction of the wedge block 82 and its shank 84 will merely shift the slide 24 and the jaw-gripped work for seating the latter on the rest surfaces 66 with a force F3 (FIG. 2) the magnitude of which is determined solely by the action of the wedge block 92 on the slide 24. Moreover, this force F3 in no wise changes the force with which the jaws hold the work parts w1 and w2 clamped together. This holds true despite the fact that it is the jaw 30 which transmits to the work part w1 the force F3 with which it is clamped to the rest surfaces 66 and which is exerted by the action of the wedge block 82 on the slide 24. Hence, while the jaw 30 transmits both forces F2 and F3, the effective force with which it clamps the work part w1 against the other work part w2 is only F2 which in magnitude is equal to F1. It will thus be readily understood that the forces with which the work parts are clamped to each other and with which the work is clamped to the rest surfaces 66 are independent of each other and are readily predeterminable as well as invariable on a pull of the drawbar 100 of a given magnitude. Since in the exemplary chuck 10 the wedge angles A and B of the wedge blocks 82 and 92 are identical, and the lever arms of the link bar 102 and wedge shank 84 about the universal connection of the crossbar 104 are also identical, it follows that the forces F1, F2 and F3 are presently also of like magnitudes.

The independence of the forces acting on the work parts to hold them clamped together on the one hand and to hold them against the rest surfaces 66 on the other hand, indicates numerous possibilities to vary these forces to suit. Thus, the force with which the work parts are clamped together by the jaws may be increased or decreased by merely varying the wedge angle B of the wedge block 92 independently of the wedge angle A of the other wedge block 82. This same force may also be varied without changing either wedge angle by merely varying, for instance, the lever arm of the link 102 about the universal connection of the crossbar 104. Conversely, the force with which the work is clamped to the rest surfaces 66 may be increased or decreased by merely varying the wedge angle A of the wedge block 82 independently of the wedge angle B of the other wedge block 92, in which case the force with which the work parts are clamped together will remain unchanged. As an alternative to the last expediency, the lever arm of the wedge shank 84 about the universal connection of the crossbar 104 may be changed without changing either wedge angle A or B.

While in the described chuck 10 the coplanar surfaces 66 of the work rests 62 serve to locate work W only partially in the chuck, FIGS. 4 and 5 show a modified chuck 10a in which the rest surfaces 66a of the work rests 62a serve completely to locate work W' in the chuck. Thus, the exemplary partible work W' may consist of two parts w1a and w2a of which the part w1a has oppositely slanting machined surfaces 146 with reference to which the work is to be centered in the chuck. To this end, the rest surfaces 66a are slanted the same as the reference surfaces 146 of the work part w1a and are also accurately centered on the chuck axis xa. The slide 24a has in its guideway 22a in the chuck body 12a freedom to float in a plane normal to the chuck axis xa sufficiently to permit the work W' to center itself on the rest surfaces 66a. In order that the wedge shank 84a and the link bar 102a may follow the slide 24a in its floating movement laterally of the plane pa, the wedge shank 84a may have a universal connection 150 with the crossbar 104a (FIG. 5) and another universal connection (not shown) with its wedge block, and be slidable and turnable in a block 152 which is guided for limited movement at right angles to the plane pa in a recess 154 in the chuck body 12a, while the link bar 102a may have a universal connection 156 with a crossbar 104a and another universal connection (not shown) with its wedge block.

While in the described exemplary chuck 10 of FIG. 2 the jaws will grip work externally thereof, it is, of course, fully within the purview of the present invention to arrange the chuck in self-evident manner so that the jaws move outwardly to grip work internally and locate it with a reference surface or surfaces thereof on a rest surface or surfaces on the chuck body with a force which may be different from that with which the jaws clamp the work between each other. Also, while the described chucks 10 and 10a are particularly useful for gripping and locating parted work, they are equally useful in connection with non-parted workpieces having reference surfaces with which they are to be located on a rest surface or surfaces on the chuck body but which for one reason or another are not used as surfaces to be engaged by jaws, movable or non-movable, with which to grip the work and hold it in the chuck.

Finally, considering the specific exemplary chucks 10 and 10a in their broader aspects, the same feature a slide with fixed jaw means and a movable counter jaw and also carrying jaw-operating means, which together form a unit that lends itself to ready movability on the chuck body in any direction in a plane transverse to its axis for bringing jaw-gripped work into seating engagement with a locating surface or surfaces on the chuck body.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A chuck, comprising a body with an axis; a slide having jaw means and being movable on said body in a plane transverse to said axis for engagement of its jaw means with and disengagement from work on one side thereof; a jaw guided in said slide for movement into and from engagement with work on the opposite side thereof; a device movable with said slide and operable to relatively move said jaw and said slide with its jaw means into and from engagement with work and clamp them to the latter; a work-locating surface on said body on and from which to seat and unseat gripped work on moving said slide in opposite directions in said plane; and means operable to move said slide in said opposite directions and apply thereto clamping pressure with which to hold gripped work on said locating surface when seated thereon.

2. A chuck, comprising a body with an axis; a slide having jaw means and being movable on said body in a plane transverse to said axis in at least two opposite directions for engagement of its jaw means with and disengagement from work on one side thereof; a jaw guided in said slide for movement in said opposite directions into and from engagement with work on the opposite side thereof; a device movable with said slide and operable to relatively move said jaw and said slide with its jaw means into and from engagement with work and clamp them to the latter; a work-locating surface on said body on and from which to seat and unseat gripped work on moving said slide in one and the other of said opposite directions, respectively; and actuating means operable to move said slide in said opposite directions and apply thereto a clamping force in said one direction when gripped work is seated on said surface.

3. A chuck as set forth in claim 2, in which said slide is guided on said body for movement in said plane in said opposite directions only.

4. A chuck, comprising a body with an axis; a slide having a jaw and being movable on said body in a plane transverse to said axis in at least two opposite directions for engagement of its jaw with and disengagement from work on one side thereof; another jaw guided in said slide for movement in said opposite directions into and from engagement with work on the opposite side thereof; means movable with said slide and operable to relatively move said other jaw and said slide with its jaw into and from engagement with work and clamp them to the latter; a work-locating surface on said body on and from which to seat and unseat gripped work on moving said slide in one and the other of said opposite directions, respectively; and means operable to move said slide in said opposite directions and apply thereto a clamping force in said one direction when gripped work is seated on said surface, and the jaw closing on work in said one direction having a work-gripping surface arranged to hold work in stable equilibrium when resting thereon by gravity.

5. A chuck, comprising a body with an axis; a longitudinal slide having jaw means at one end and being lonigtudinally movable on said body in a plane transverse to said axis in at elast two opposite directions for engagement of its jaw means with and disengagement from work on one side thereof; a jaw carried by said slide for movement longitudinally thereof into and from engagement with work on the opposite side thereof; a device movable with said slide and interposed between said jaw and the other end of said slide and being operable to move apart and jam between said jaw and other slide end for relatively moving said jaw and said slide with its jaw means into engagement with work and clamping them to the latter, respectively; a work-locating surface on said body on and from which to seat and unseat gripped work on moving said slide in one and the other of said opposite directions, respectively; and actuating means operable to move said slide in said opposite directions and apply thereto a clamping force in said one direction when gripped work is seated on said surface.

6. A chuck as set forth in claim 5, in which said device is a wedge member slidable between and in follower relation with said jaw and other slide end.

7. A chuck as set forth in claim 5, in which said slide is guided on said body for movement in said plane in said opposite directions only, and said device is a wedge member slidable between and in follower relation with said jaw and other slide end.

8. A chuck as set forth in claim 5, in which said actuating means is a wedge member slidably carried by said body and in follower relation with said slide.

9. A chuck as set forth in claim 5, in which said device is a wedge member slidable between and in follower relation with said jaw and other slide end, and said actuating means is also a wedge member slidably carried by said body and in follower relation with said slide.

10. A chuck as set forth in claim 5, in which said jaw is interposed between said jaw means and said other end of said slide, and the work-gripping surfaces of said jaw and jaw means face each other for gripping work externally thereof.

11. A chuck, comprising a body with an axis; a slide having a jaw and being movable on said body in a plane transverse to said axis in at least two opposite directions for engagement of its jaw with and disengagement from work on one side thereof; another jaw guided in said slide for movement in said opposite directions into and from engagement with work on the opposite side thereof; a device movable with said slide and operable to relatively move said other jaw and said slide with its jaw into and from engagement with work and clamp them to the latter; a work-locating surface on said body on and from which to seat and unseat gripped work on moving said slide in one and the other of said opposite directions, respectively; and means operable to move said slide in said opposite directions and apply thereto a clamping force in said one direction when gripped work is seated on said surface, at least that one of said jaws closing on work in said one direction being formed in two parts of which one part has a work-gripping surface and is within the confines of the latter pivoted to the other part for limited rocking motion about an axis parallel to said plane and at right angles to said opposite directions.

12. A chuck, comprising a body with an axis; a longitudinal slide having jaw means at one end and being guided in a path on the forward end of said body for longitudinal movement in a plane normal to said axis in first and second opposite directions for gripping engagement of its jaw means with and disengagement from work, respectively, on one side of the latter; a jaw guided on said slide for movement in said second and first directions into and from gripping engagement with work, respectively, on the opposite side of the latter; a work-locating surface on said body on and from which to seat and unseat work on said jaw means on movement of said slide in said first and second directions, respectively; a first wedge member in follower relation with said slide at said one end thereof and having a rearward shank guided in said body for movement parallel to said axis in third and fourth opposite directions for moving said slide in said first and second directions, respectively; another wedge member interposed between and in follower relation with said jaw and the other end of said slide and movable in said third and fourth directions to move said jaw in said second and first directions, respectively; and a jaw-actuating device comprising a link pivotally connected at its forward end with said other wedge about another axis parallel to said plane and at right angles to said slide path and extending rearwardly in said body with clearance therefrom, a crossbar extending in said body with clearance therefrom and having at its opposite ends pivot connections with the rear ends of said shank and link about axes parallel to said other axis, and an operating element in the rear of said body having with said crossbar intermediate its ends a pivot connection about an axis parallel to said other axis and being movable to cause movement of said wedge members in said third and fourth directions.

13. A chuck as set forth in claim 12, further comprising means acting on said crossbar at a place between its pivot connections with said link and element and yieldingly opposing movement of said crossbar thereat on movement of said element to compel said jaw means to seat non-gripped work thereon on said locating surface before said jaw closes on the work.

14. A chuck as set forth in claim 13, in which said means is a compression spring interposed between said body and said crossbar at said place thereof.

15. A chuck as set forth in claim 12, in which said jaw is interposed between said jaw means and said other end of said slide, and the work-gripping surfaces of said jaw and jaw means face each other for gripping work externally thereof.

References Cited in the file of this patent

UNITED STATES PATENTS

| | | |
|---|---|---|
| 1,780,390 | Hopkins | Nov. 4, 1930 |
| 2,696,386 | Johnson | Dec. 7, 1954 |
| 2,759,735 | Cross | Aug. 21, 1956 |
| 2,775,461 | Ehrlich | Dec. 25, 1956 |
| 2,893,744 | Anthony | July 7, 1959 |